INVENTOR:
DENNIS G. PIERCE
BY: James E. Nilles
Daniel D. Fetterley
ATTORNEYS

United States Patent Office 3,475,585
Patented Oct. 28, 1969

3,475,585
WELDING APPARATUS EMPLOYING SINGLE POWER SUPPLY FOR STRAIGHT AND REVERSE WELDING POLARITIES
Dennis G. Pierce, Hales Corners, Wis., assignor, by mesne assignments, to Chemetron Corporation, Chicago, Ill., a corporation of Delaware
Filed July 27, 1967, Ser. No. 656,412
Int. Cl. B23k 9/00, 9/10
U.S. Cl. 219—131                 9 Claims

ABSTRACT OF THE DISCLOSURE

A bi-polarity welding apparatus employs a single power supply and a connection means to provide both straight and reverse welding polarities, thereby permitting the apparatus to energize welding electrodes utilized in a plurality of welding processes requiring differing welding polarities. A pair of welding electrodes are connected to a common neutral terminal and to the voltage output terminals of different polarities, respectively. The electrodes are connected to the output terminals via actuable switches for activating the electrode of the desired polarity. The activation of either of the electrode switches serves to simultaneously activate a connection means for connecting the opposite polarity terminal to the neutral terminal.

BACKGROUND OF THE INVENTION

The present invention pertains to welding apparatus and, more particularly, to direct current welding power supplies of the bi-polarity type.

In direct current welding, the energizing voltage applied to the welding electrode or rod may be of either polarity with respect to the workpiece. That is, the voltage applied to the electrode may be either negative or positive with respect to the workpiece. The former condition is termed straight polarity; the latter condition is termed reverse polarity.

Certain direct current welding processes require straight polarity while others require reverse polarity. For example, submerged arc welding is generally performed under straight polarity conditions while gas shielded arc welding, such as $CO_2$ shielded arc welding, is performed under reverse polarity conditions.

In numerous instances, it is necessary to use two or more welding processes requiring differing polarity conditions in order to provide the necessary characteristics to a finished weld. When welding in a deep groove, it may initially be necessary to place a low penetration weld bead in the bottom of the groove so as to prevent burning through. This is generally done with the straight polarity submerged arc process. Higher penetration weld beads are then placed in the groove by means of the reverse polarity gas shielded arc process.

A plurality of welding processes requiring differing welding polarities are also employed when welding both heavy members and light, sheet metal members or when welding horizontal and vertical members.

In the past, it has been necessary to utilize a plurality of welding power supplies to make available both the straight and reverse welding polarities required by the various welding processes. This has resulted in duplication of power supply equipment with the attendant increase in expense, maintenance and bulk.

SUMMARY OF THE INVENTION

The present invention provides a welding apparatus which utilizes a single welding power supply to provide both straight and reverse welding polarities. The power supply includes a pair of voltage output terminals of different polarities and a neutral terminal. The welding electrodes are connected to the voltage output terminals through actuable switches while a connection means, operable by the switches, is connected between the voltage output terminals and the neutral terminal. This connection means is operable by the actuation of the switches to connect one or the other of the voltage output terminals to the neutral terminal, and hence the workpiece, thereby to establish the desired welding polarity between the workpiece and the corresponding electrode.

DESCRIPTION OF THE PREFERRED EMBODIMENTS

Figure 1:
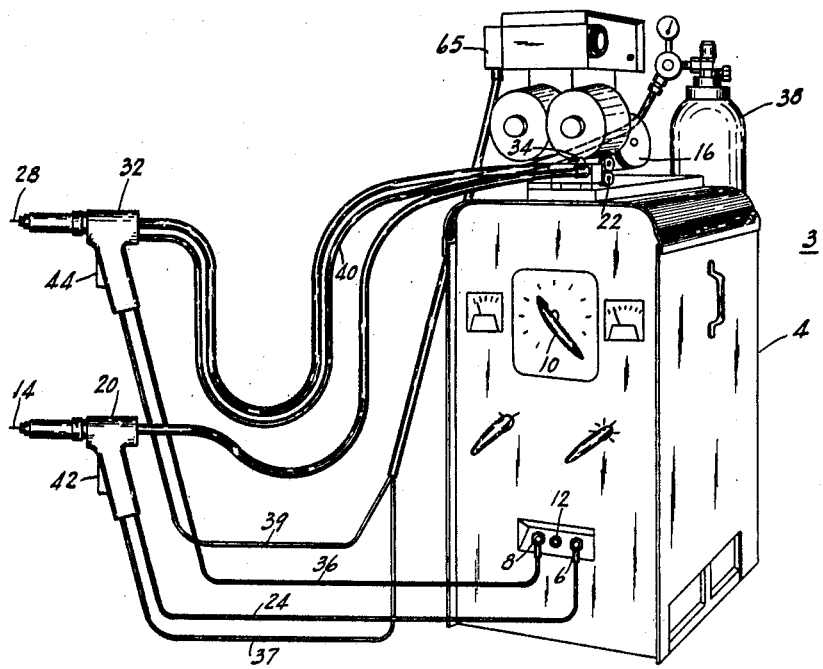
FIGURE 1 is a perspective view of the welding apparatus of the present invention.

Referring now to FIGURE 1, there is shown therein the welding apparatus of the present invention, indicated by the numeral 3. Apparatus 3 includes power supply 4 suitable for connection to an available power source, for example, alternating current power mains. Power supply 4 converts the alternating current power into direct current power suitable for welding. The direct current power is supplied to a pair of voltage output terminals 6 and 8. Output terminal 6 provides direct current voltage of the positive polarity. The magnitude of the voltage at output terminals 6 and 8 may be altered by adjustment means 10. A ground or neutral terminal 12 is also provided in power supply 4.

Power supply 4 energizes a pair of electrodes, one of which is connectable to the positive polarity voltage output terminal and the other of which is connectable to the negative polarity voltage output terminal. By way of example, one such electrode, electrode 14, may comprise a soft or flux cored electrode suitable for use in a submerged arc welding process. The submerged arc process generally requires that the electrode be of a negative polarity with respect to the workpiece so that electrode 14 is connectable to the negative voltage of output terminal 6 of power supply 4 by means of conductor 24. Electrode 14 is in the form of a flexible wire and is stored on spool 16. The wire is applied to workpiece 18 by means of a handle or gun 20 through which the wire is threaded. The wire is propelled through gun 20 by motor driven wire feeder 22. The pulverulent flux 26, see FIGURE 2, necessary for the submerged arc welding process may be applied directly to the workpiece prior to welding or may be metered into the weld area during welding.

The other of the welding electrodes, electrode 28, may also be in the form of a flexible wire and is stored on spool 30. Electrode 28 may comprise a hard or solid wire suitable for use in an inert gas shielded welding process. As the inert gas shielded welding process generally requires that the electrode be of the positive polarity, electrode 28 is connectable to the positive voltage output terminal 8 of power supply 4 by means of conductor 36. Similar to electrode 14, electrode 28 is applied to workpiece 18 by means of a welding gun 32 through which electrode 28 is threaded. Electrode 28 is propelled by a motor driven wire feeder 34. The inert gas shielding the arc is provided to gun 32 from storage tank 38 by means of conduit 40.

Figure 2:
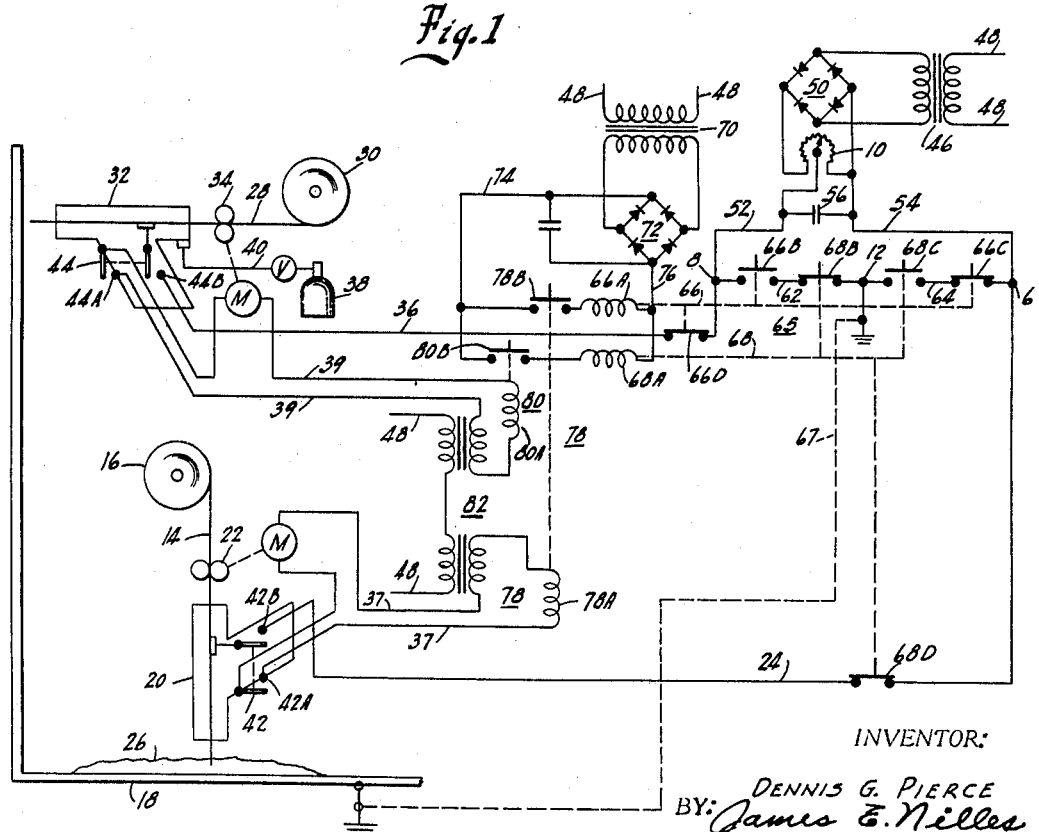
FIGURE 2 is a schematic diagram of the apparatus of the present invention.

Welding guns 20 and 32 contain operator actuated switches 42 and 44, respectively, by means of which the operator controls the initiation and cessation of the welding process. Specifically, and as shown in FIGURE 2, each of switches 42 and 44 contains two pair of contacts 42A and 42B, and 44A and 44B. Switch contacts 42B and 44B control the energization of welding electrodes 14 and 28, respectively, while switch contacts 42A and 44A control wire feeders 22 and 34 and the operation of welding apparatus 3, through conductors 37 and 39, respectively, as hereinafter described.

Welding power supply 4 of apparatus 3 may include transformer 46, the primary winding of which is connected to alternating current power mains 48, and the secondary winding of which is connected to rectifier bridge 50. Positive polarity bus 52 and negative polarity bus 54 extend from rectifier bridge 50. A filter circuit, shown diagrammatically, as capacitor 56, and adjustment means 10, shown diagrammatically, as a center tapped voltage divider, may be connected between positive polarity bus 52 and negative polarity bus 54. Positive polarity bus 52 is connected to positive polarity voltage output terminal 8 while negative polarity bus 54 is connected to negative polarity voltage ouput terminal 6.

Power supply 4 also includes neutral or ground terminal 12. Conductor 62 containing a pair of series connected relay contacts hereinafter described, connects positive polarity voltage output terminal 8 to neutral terminal 12 when both the relay contacts are closed. Conductor 64, also containing a pair of series connected relay contacts connects negative polarity voltage output terminal 6 to neutral terminal 12 when both the relay contacts are closed. Neutral terminal 12 is connected to workpiece 18 by means of a common ground or by means of a conductor 67.

The aforementioned pairs of relay contacts form part of connection means 65 which includes relays 66, and 68. Specifically, relay 66 comprises relay coil 66A, normally open relay contact 66B in conductor 62, and normally closed relay contact 66C in conductor 64. Relay 68 comprises relay coil 68A, normally closed relay contact 68B in conductor 62 and normally open relay contact 68C in conductor 64.

Relays 66 and 68 are energized by a power supply shown illustratively as transformer 70 connected to alternating current power means 48 and rectifier bridge 72. The relay coils are connected in parallel across the output busses 74 and 76 of rectifier bridge 72.

Relays 66 and 68 are controlled by a switch means connected in series with relay coils 66A and 68A. Such switch means may be switches 44 and 42, respectively, on guns 32 and 20, or, as shown in FIGURE 2, may comprise the contacts of pilot relays 78 and 80. Pilot relay 78 includes relay coil 78A connected in series with switch contact 42A and power supply 82, and contact 78B connected in series with relay coil 66A. Pilot relay 80 includes relay coil 80A connected in series with switch contact 44A and power supply 82, and contact 80B connected in series with relay coil 68A. Power supply 82 may consist of a transformer connected to alternating current supply mains 48.

When neither gun 20 nor gun 32 is subjected to operator control, that is, when both switches 42 and 44 are open pilot relays 78 and 80 are in the de-energized state, as are relays 66 and 68. Relay contacts 66B are opened while relay contacts 66C are closed. Relay contacts 68B are closed while relay contacts 68C are opened. Due to open relay contacts 66B and 68C, any by-passing or shorting of output terminals 6 and 8 to neutral terminal 12 is prevented. Negative polarity voltage is thus supplied from output terminal 6 to conductor 24 while positive polarity voltage is supplied to conductor 36 from output terminal 8. No voltage is supplied to either of welding electrodes 14 or 28 due to open switch contacts 42B and 44B.

To initiate a welding operation, the contacts of either switch 42 or 44 on gun 20 or 32, respectively, are closed. In the present instance, it may be assumed that it is first desired to weld with gun 20 under straight polarity conditions, as for example, to deposit a horizontal weld on workpiece 18 by means of the submerged arc process, and subsequently desired to weld with gun 32 under reverse polarity conditions to deposit a vertical weld bead on workpiece 18 by means of the inert gas shielded process.

To utilize gun 20, switch 42 is actuated to close contacts 42A and 42B. The closing of switch contact 42A energizes wire feeder 22 to feed electrode 14 through gun 20 toward workpiece 18. The actuation of switch contact 42A also energizes relay coil 78A to close contacts 78B. The closing of contact 78B energizes relay coil 66A which closes normally open relay contact 66B and opens normally closed relay contact 66C. The closing of relay contact 66B connects positive polarity bus 52 to neutral terminal 12 through normally closed relay contact 68B and supplies the positive polarity voltage from positive polarity voltage output terminal 8 to workpiece 18.

Open relay contact 66C, on the other hand, prevents any connection of negative polarity bus to neutral terminal 12 so that that bus is connected to negative polarity voltage output terminal 6 and through conductor 24 to electrode 14. As electrode 14 is fed toward workpiece 18, the welding arc is formed by the negative polarity voltage on electrode 14 and the positive polarity voltage on workpiece 18. As previously noted, such a negative electrode positive workpiece polarity condition is termed straight polarity. The welding bead is deposited by drawing gun 20 along workpiece 18.

No voltage is supplied to electrode 28 in gun 32 because of open switch 44. If desired, relay 66 may contain additional contacts 66D in conductor 36 which are opened when relay 66 is energized to interrupt the voltage in conductor 36 and prevent the application of voltage to electrode 28 in the event of an accidental closing of switch 44.

To terminate the welding process, switch 42 is opened, de-energizing wire feeder 22 and electrode 14. The opening of switch 42 also de-energizes relay coil 78A and opens contact 78B. This, in turn, de-energizes relay coil 66A and reopens normally open relay contact 66B and recloses normally closed relay contact 66C. The reopening of normally open relay contact 66B disconnects positive polarity bus 52 from neutral terminal 12. The reclosing of relay contact 66C has no effect on the connection of negative polarity bus 54, due to normally open relay contact 68C.

To utilize gun 32 to deposit a vertical weld bead on workpiece 18 by means of the reverse polarity insert gas shielded process, switch 44 is actuated to close both sets of contacts, 44A and 44B. The closing of switch contact 44A energizes wire feeder 34 as well as relay coil 80A. The energization of relay coil 80A closes contact 80B and energizes relay coil 68A to open normally closed relay contact 68B and close normally open relay contact 68C.

As both normally open relay contact 66B and relay contact 68B in conductor 62 are open, positive polarity bus 52 cannot be connected to neutral terminal 12, but rather supplies positive polarity voltage to positive polarity voltage output terminal 8. The positive polarity voltage is supplied, via conductor 36 and closed switch contact 44B, to electrode 28.

Closed relay contacts 66C and 68C connect negative polarity bus 54 to neutral terminal 12, via conductor 64, and to workpiece 18, via the common ground connection.

Relay contact 68D may be opened by the energization of relay 68 to interrupt the voltage in conductor 24 and prevent the application of voltage to electrode 14 in the event of an accidental closing of switch 42.

As the positive polarity electrode 28 is fed toward negative polarity workpiece 18, the reverse polarity welding arc is formed. This arc is shielded from the atmosphere by inert gas from tank 38 and conduit 40. The weld bead is deposited by drawing gun 20 along the workpiece.

The welding process is terminated by opening switch contacts 44A and 44B to remove the positive polarity voltage from electrode 28 and to stop the feeding of the electrode by wire feeder 34. The opening of switch contacts 44A de-energizes pilot relay 80 which, in turn, de-energizes relay 68 to return relay contact 68B to the normally closed position and relay contact 68C to the normally open position.

From the foregoing it will be appreciated that the welding apparatus of the present invention provides both straight and reverse welding polarities from a single power supply by the use of a connection means, thereby eliminating the need for separate power supplies to provide each welding polarity.

I claim:

1. Bi-polarity welding apparatus having a pair of welding electrodes energizable with voltages of differing polarities, a single welding power supply having a pair of voltage output terminals, each providing a voltage of a different polarity, and a neutral terminal, each of said welding electrodes being connected to one of said output terminals and supplied with voltage therefrom through an actuable switch, and connection means connected between the terminals of said welding power supply and said neutral terminal, said connection means being operable by the actuation of the switch which connects one electrode to one of said output terminals to connect the other of said output terminals to said neutral terminal, and said connection means being operable by the actuation of the switch which connects the other of said electrodes to the other of said output terminals to connect the one of said output terminals to said neutral terminal.

2. The welding apparatus of claim 1 wherein said connection means is further defined as having means operable by the actuation of said switches to remove the voltage from the electrode not connected to the output terminal of said welding power supply.

3. The welding apparatus of claim 1 wherein said connection means includes a pair of relays interposed between said output terminals of said power supply and said neutral terminal, one of said relays being connected to and operable by the actuation of the one of said switches, the other of said relays being connected to and operable by the actuation of the other of said switches.

4. The welding apparatus of claim 3 wherein each of said relays contains a pair of contacts, one contact of each of said relays being serially connected between each of said output terminals and said neutral terminal.

5. The welding apparatus of claim 1 wherein each of said electrodes has a handle associated therewith through which said electrode is fed and said actuable switches are located in said handles.

6. Bi-polarity welding apparatus for energizing a pair of welding electrodes with voltages of differing polarities, said electrodes having actuable switches associated therewith, said apparatus including a single welding power supply having a pair of voltage output terminals, each providing a voltage of a different polarity, and a neutral terminal, said welding electrodes being connectable to said output terminals through said actuable switches, said bi-polarity welding apparatus also including a connection means connected to said terminals of said welding power supply, said connection means being connectable to said switches and operable by the actuation of the switch associated with the electrode connectable to one of said output terminals to connect the other of said output terminals to said neutral terminal and operable by the actuation of the switch associated with the electrode connectable to the other of said output terminals to connect the one of said output terminals to said neutral terminal.

7. The welding apparatus of claim 6 wherein said connection means is further defined as having means operable by the actuation of said switches to prevent the application of voltage from the output terminals to the electrode not connected to said power supply.

8. The welding apparatus of claim 6 wherein said bypass means includes a pair of relays interposed between said output terminals of said power supply and said neutral terminal, one of said relays being connected to and operable by the actuation of the one of said switches, the other of said relays being connected to and operable by the actuation of the other of said switches.

9. The welding apparatus of claim 8 wherein each of said relays contains a pair of contacts, one contact of each of said relays being serially connected between each of said output terminals and said neutral terminal.

References Cited

UNITED STATES PATENTS 3,324,379  6/1967  Mulder.

JOSEPH V. TRUHE, Primary Examiner

J. G. SMITH, Assistant Examiner

U.S. Cl. X.R.

219—130; 307—38